March 25, 1958 H. W. DENISON ET AL 2,828,088
SPINNING REEL

Filed April 15, 1954 2 Sheets-Sheet 1

INVENTORS
HENRY WARREN DENISON
LLOYD E. JOHNSON
BY Carlsen & Hayle
ATTORNEY

March 25, 1958
H. W. DENISON ET AL
2,828,088
SPINNING REEL
Filed April 15, 1954
2 Sheets-Sheet 2
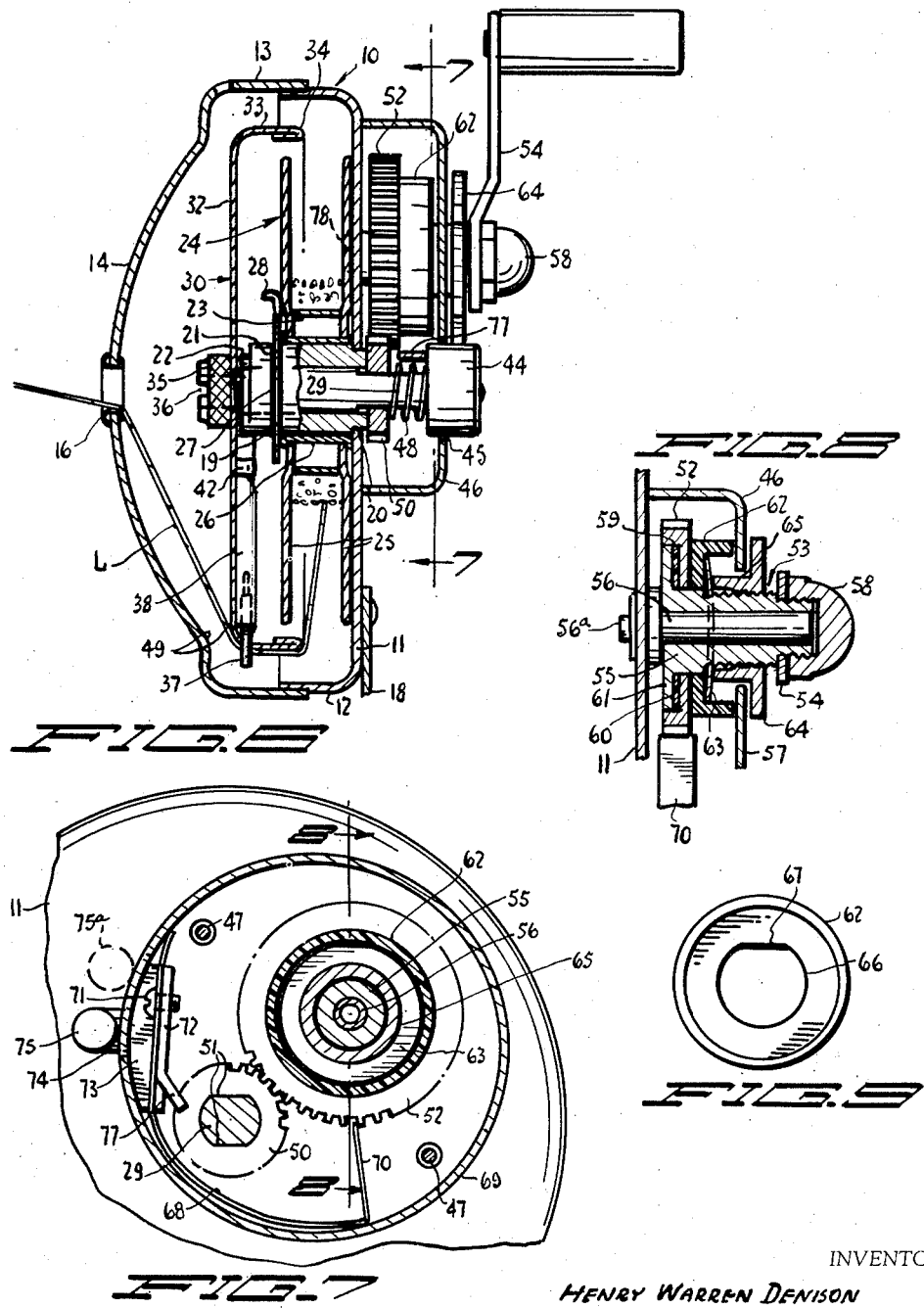
INVENTORS
HENRY WARREN DENISON
LLOYD F. JOHNSON
BY Carlsen & Hazle
ATTORNEYS United States Patent Office
2,828,088
Patented Mar. 25, 1958

2,828,088

SPINNING REEL

Henry Warren Denison and Lloyd E. Johnson,
Mankato, Minn.

Application April 15, 1954, Serial No. 423,306

9 Claims. (Cl. 242—84.2)

This invention relates generally to improvements in fishing reels of the spinning variety, wherein the line holding spool is stationary and the fishing line peels off over one end of the spool in casting. More particularly the invention relates to improvements in that type of reel as disclosed in our earlier Patent No. 2,644,647, issued July 7, 1953, and in our copending applications Serial Nos. 247,304, now Patent No. 2,667,312 and 319,208, now Patent No. 2,719,680, filed September 19, 1951, and November 7, 1952, respectively.

In the present instance the primary object of the invention is to provide a number of novel and valuable improvements over the reels as disclosed in the prior disclosures identified above, such improvements not only being of a nature such as to facilitate the operation and improve the utility of the reel but also to improve the same from the manufacturing standpoint and from the service angle.

A further object of this invention is to provide a spinning reel having an extremely effective drag, operative on the axis of the crank handle by means of a star wheel, and so constructed and arranged that the amount of drag opposing outward flow of the fishing line may be very precisely adjusted. Furthermore, once the amount of drag is so adjusted it will remain constant until subsequently varied by a further operation of the star wheel.

Another object of our invention is to provide a spinning reel in which the line carrying spool may be very conveniently removed and replaced when it is desired to change the characteristics of the line being used and, furthermore, so that the spool may be reversed to adapt the reel to either right hand or left hand operation. All of such manipulations may be carried out readily without the use of any tools and with no danger of damagingly disturbing the mechanism of the reel in any way.

Another object of the invention is to provide an improved click arrangement for spinning reels of this type which is self-contained within the gear case and operates upon the driving gear. It is a novel characteristic of our particular type of spinning reel that the line is released to peel freely off the stationary spool by the manipulation of a centrally located control button which operates to position a spooling member and which when pushed in, so to speak, retracts a pick-up or spooling pin in order to free the line. It is, of course, undesirable for this action to take place accidentally, when playing a fish or trolling for example, and in accordance with our present invention the aforesaid click is arranged to lock the control button so that it cannot be pushed in to retract the pick-up or spooling pin as long as the click itself is in operation.

These and other more detailed and specific objects will be disclosed in the course of the following specification, reference being had to the accompanying drawings, in which:

Fig. 6 is a diametrical section through the reel on an enlarged scale.

Fig. 7 is a sectional detail view through the gear case, taken substantially along the line 7—7 in Fig. 6, and showing the click in engagement with the drive gear.

Fig. 8 is a detail view through the drag mechanism as viewed substantially along the line 8—8 in Fig. 7.

Fig. 9 is an elevational view of the cup-like drag washer which operates against the drive gear.

Figure 1:
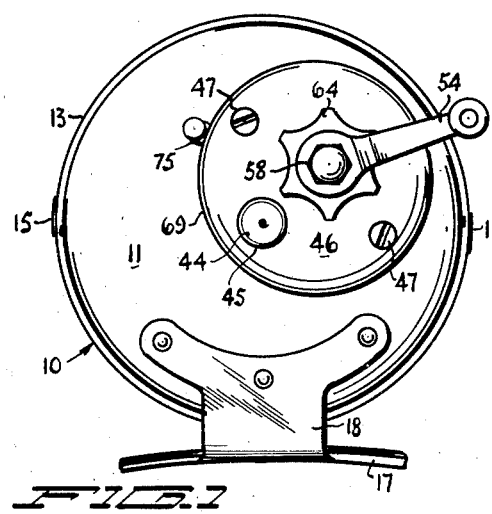
Fig. 1 is a side elevation of our improved spinning reel as taken from the side carrying the gear case, crank, star drag, etc.
Figure 2:
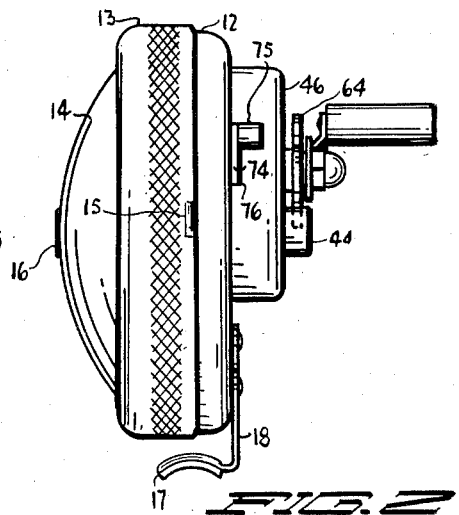
Fig. 2 is an edge view of the reel.
Figure 3:
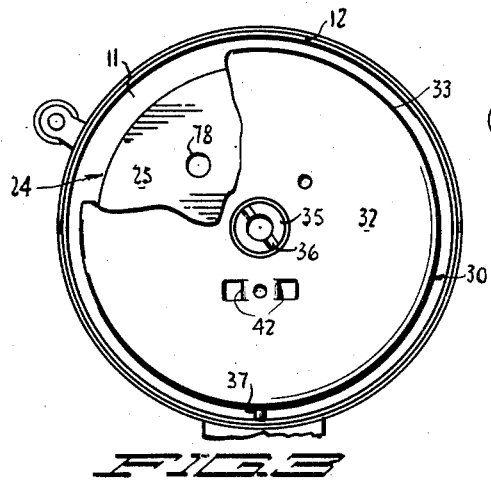
Fig. 3 is an elevational view from the side opposite that viewed in Fig. 1, with the reel cover removed, to disclose the interior of the reel. In this view the spooling member is partially broken away to show the line spool.

Referring now more particularly and by reference characters to the drawing our present reel, in common with those of the earlier disclosures, includes a frame or case, designated generally at 10, made up of a circular end plate 11 having marginal flanges 12 upon which is fitted the flange 13 of a cover 14 to complete an enclosure for the spool and related parts of the reel. The flange 13 is formed with ordinary bayonet-like locking grooves at the points 15 for engagement with slight projections upon the flanges 12 so that the cover may be locked in place, or unlocked, by rotating it slightly in opposite directions with reference to the case 10. Further in common with the earlier reels, the cover 14 is provided at its center with a bearing eyelet 16 out through which the fishing line L will be directed, as seen in Fig. 6. For mounting the reel upon the ordinary fishing rod the reel is provided with a mounting tang 17 from which there is turned a laterally disposed flange 18 riveted or otherwise suitably secured to the end plate 11. Also forming part of this frame structure is a centrally located, stationary bearing 19 and the same in this instance is press fitted or otherwise permanently mounted in an opening 20 provided for its reception in the end plate 11. The bearing itself is tubular, for the slidable and rotatable accommodation of a spooling member drive shaft as will presently appear. Also in accordance with our present invention the bearing 19 is formed with an annular peripherally extending groove 21 adjacent its inner end and spaced substantially from the end plate 11, while at its extremity the bearing is reduced eccentrically to form a stationary cam 22, the function of which will also shortly appear.

Figure 4:
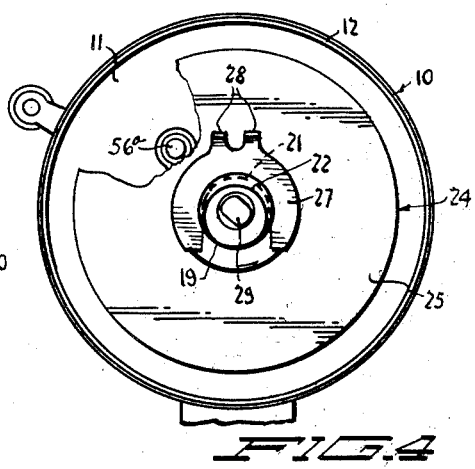
Fig. 4 is a view similar to Fig. 3 but with the spooling member entirely removed, showing the clip by which the line spool is removably held in place and with a part of the line spool broken away to disclose the pin by which the line spool is anchored against rotation.

The fishing line L is wound upon the cylindrical core 23 of a line spool, designated generally at 24, having opposed spool ends 25 of circular shape to thereby provide an annular space for accommodation of the necessary amount of line. The end plates 25 are provided centrally with openings through which there projects and is secured a tubular spool hub 26 adapted to nicely slip upon the bearing 19 with one of the end plates 25 in contact with the inner surface of the end plate 11 of the reel case, as clearly shown in Fig. 6. When thus positioned the spool 24 is held against axial displacement in the opposite direction by means of a U-shaped retainer clip or key 27 made up of spring material and best shown in Fig. 4. It is obvious that this key 27 may have its spaced legs slipped in the aforesaid groove 21 in the bearing and with that groove properly spaced from the end plate 12, then the clip will firmly hold the spool in place. However, the clip is also provided with spaced, outwardly turned lugs 28 by means of which it may be readily grasped or engaged by the thumbnail to strip it from the groove 21 to permit the removal of the spool. This simple and convenient spool mounting is of considerable importance because in the use of spinning reels it is very often desired to shift from one type of fishing line to another, or to lines having different tensile strengths, and it is possible in accordance with our present invention for the fisherman to carry as many filled spools as he may require and readily change them as needed. Furthermore, since the direction in which the line is initially wound upon the spool will determine the direction in which the reel crank must be turned for retrieving the line, it is possible to reverse the spools end for end so that crank rotation will be effective in the desired direction for either right or left hand operation, as will be understood by those skilled in the art.

The bearing 19 also rotatably and axially slidably supports a drive shaft 29, the inner end of which projects beyond the eccentrically reduced cam end of the bearing for mounting and operating a spooling member 30. For this purpose this end of the drive shaft 29 is reduced, threaded and provided with opposed flats, as seen to best advantage in Fig. 4, in order to non-rotatably engage the correspondingly shaped center opening 31 (Fig. 5) in the spooling member. In common with the earlier reels the spooling member 30 includes a circular end plate 32 of larger diameter than the reel spool 24 and provided with a flange 33 turned toward the spool and projecting beyond the adjacent end plate 25 thereof. Thus the fishing line L, as it travels between the spool and the bearing eyelet 16, must pass over the flange 33 of the spooling member and for obvious reasons the edge of said flange is made very smooth by turning it back upon itself or rolling it, as seen at 34 in Fig. 6. A retaining nut 35 is screwed upon the extremity of the shaft 29 and to facilitate its operation this nut is both knurled and provided with the usual wide kerfs 36 so that the nut may be turned up tight or loosened by the use of a coin. Obviously when the nut 35 is turned up tightly the spooling member 30 is anchored to the shaft 29 to rotate therewith and, as will presently appear, such rotation of the shaft is accomplished by the usual crank with which most reels are provided in order to spool the line upon the spool 24.

Figure 5:
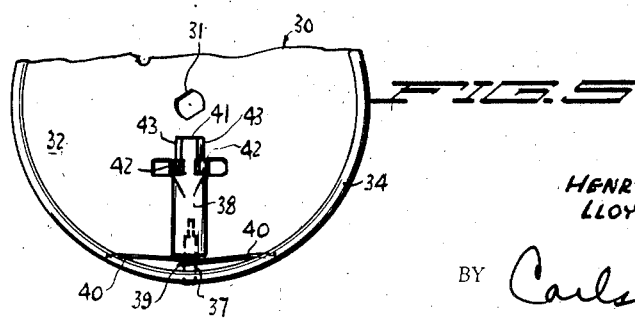
Fig. 5 is a fragmentary inside elevational view of the spooling member, disclosing the construction and arrangement of the pick-up or spooling pin.

The spooling of the line is accomplished by a pick-up pin or spooling member 37 which normally projects radially through the flange 33 of the spooling member 30 adjacent the point at which said flange merges with the center plate 32. In the present instance the pin 37 is of an especially hard and smooth metal resistant to line wear and within said flange the pin is press fitted into a carrier 38 of plastic-type material lying immediately within the end plate 32 and disposed radially with respect thereto. A length of spring wire (Fig. 5) is coiled at 39 around the pin 37 where it joins said carrier 38 and the opposite ends of the spring, designated at 40, are then arranged to engage the inside of the flange 33 to normally bias the pin 37 and carrier 38 inwardly, as seen in Fig. 5. The inner extremity 41 of the carrier 38 rides the periphery of the aforesaid cam 22 and exposed end portion of the bearing 19 when the spooling member 30 is in its normal position (Fig. 6) and the pin 37 is then projected from the flange 33 to pick up and spool the line upon rotation of said spooling member. The spooling pin carrier 38 is slidably mounted within the spooling member 30 by ears 42 which are punched inwardly from the end plate 32 to slidably engage angularly surfaced sides 43 of the carrier, as clearly shown in Fig. 5.

The outer end of the drive shaft 29 is fitted with a control member or button 44 and the same is exposed through an opening 45 in a gear case 46 removably mounted upon the end plate 11 by screws 47. Such exposure of the control button 44 places it in a position for convenient operation by the operator's thumb or finger so that it may be pressed inwardly to project the drive shaft 29 and attached spooling member 30 toward the left as viewed in Fig. 6, such motion being yieldably opposed by an expansion coil spring 48 on the shaft and within the gear case. This movement of the drive shaft 29 and spooling member 30 will carry the inner end of the pick-up pin carrier 38 clear of the cam surfaced extremity of the bearing 19, whereupon the spring 40 will project the pin 37 inwardly to the position shown in Fig. 5 so that the fishing line L may peel or spin freely off the end of the spool 24. The outward flow of line, however, may be stopped at any point by a slight further inward movement of the control button 44 so that the line is snubbed between the points 49 on the spooling member and reel cover 14.

The drive shaft 29 is rotated for spooling line by a driven gear 50, slidably mounted upon the shaft within the gear case 46 and held against rotation by the flats 51 at opposite sides of said shaft. The gear 50 meshes with a larger drive gear 52 which is carried upon a crank shaft, designated generally at 53, adapted to be rotated by a crank 54 in the usual manner. Once the pick-up pin 37 has been retracted in order to cast the line L, rotation of the drive shaft 29 by the crank 54 will carry the inner end 41 of the carrier 38 around to a point at which it will engage the high point on cam surface 22 and, riding upon that cam surface, force the pin 37 outwardly until this spooling assembly is forced by the spring 48 back to a position for riding the end of the bearing 19, as will be readily understood.

It is, of course, necessary to provide an adjustable, frictional resistance to outward travel of the line L and for this purpose we now provide an improved star drag assembly mounted upon the axis of the crank shaft. The crank shaft is made up of an inner flanged sleeve 55 which is rotatably mounted upon a stud 56 secured to the end plate 11, as best seen in Fig. 8, and this sleeve extends loosely outward through an opening 57 in the gear case 46, with the exposed end threaded and formed with opposed flats to conventionally mount the inner end of the crank 54 by the usual cap nut 58. The drive gear 52 turns freely upon the sleeve 55 and on its inner surface is formed with an annular recess 59 in which there is mounted a friction washer 60 held in place by the flange 61 upon the sleeve. The drive gear 52 is engaged upon the opposite side by a cup-shaped friction washer 62. Both said washers are preferably made of a self-lubricating plastic-type material. Mounted upon the sleeve 55, and within the cup of this washer, there is a bowed spring washer 63. A star wheel 64 is then provided and is formed with an annular, tapped collar 65 screwed upon the sleeve 55 to enter the cup of the washer 62 and adjustably bear against the spring washer 63. Obviously the adjustment of the star wheel 64 will vary the tension of the spring washer 63 effective to bring pressure to bear upon the opposite sides of the drive gear 52 by the opposed friction washers 60 and 62. The washer 62 is constrained to rotate with the sleeve 55 by forming the center opening 66 of that washer with a flat 67, as seen in Fig. 9, for engaging a similar flat (not shown) upon the sleeve. Thus this drag or clutch assembly causes the crank 54 to drive the gears 52 and 50 but frictionally so that a sufficient tension placed upon the line L, to overcome the frictional resistance, will turn the spooling member 30 along with the drive shaft 29 and pull line from the spool 24. The star wheel 64 permits very convenient adjustment of the magnitude of the friction resisting this outward travel of the line and the assembly is further such that once such adjustment is made it is not likely to become disturbed, so that it is possible for the operator to safely set the drag to release line when the pull is somewhat below the tensile breaking strength of the line in use, as is of particular benefit in spin fishing with the very light lines often employed in this art.

Our present reel is also provided with a click mechanism, best shown in Figs. 6 and 7 and made up of an elongated, bowed click spring 68 disposed immediately within the cylindrical wall 69 of the gear case 46, with an end 70 turned inward for engaging the teeth of the drive gear 52. The opposite end of the spring 68 is secured by means of a screw 71 to the flange 72 of an arcuate click operator shoe 73. The operator shoe 63 is held against the inside of the wall 69 by the tension of the click spring and has a lip 74 turned outwardly and provided with a knob 75 so that the shoe 73 may be moved in opposite directions peripherally around the inside of said wall 69. The wall is notched at 76 to clear said lip 74 and it is obvious, in Fig. 7, that upward movement of the shoe 73 toward the dotted line position 75a of the knob will move the end 70 of the click spring clear of the drive gear and disable the click. The angle of this end 70 with respect to the axis of the gear 52 is such that the successive engagement of the teeth with the spring will cause clicking noises of different tone on opposite rotation of the gear so that the operator may tell from the sound which direction the gear is traveling.

It is very desirable that the control member 44 be locked against accidental inward movement when playing a fish, trolling or like operations, in order to prevent the freeing of the line, and for this reason the click operator shoe 73 is provided with an extension 77 of its flange 72 turned at an angle such that when the shoe is in the "on" position and the click is in engagement with the drive gear 52 this end 77 will lie within the path of the control member 44 and lock it against inward movement, as clearly shown in Fig. 6.

The line spool 24 is stationary and may be conveniently held in such position by the slight inward projection of the end 56a of the crank shaft mounting stud 56 within the end plate 11 and the corresponding provision in the ends 25 of the spool of openings 78 to engage the end 56a. Such openings 78 are provided in both ends of the reel spool 24 so that the said spool may be reversed as heretofore described.

It will be noted that the cam 22 is symmetrical having diametrically opposed low and high portions so that it functions in both directions of rotation of the spooling member 30 to pick up the pin 37 and ride it into the end of the bearing so that the pin will properly spool the line. This is, of course, a requisite since the spool as stated supra is reversible for right or left hand operation.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, a radially extending inwardly spring biased pick-up pin slidably carried by the spooling member and operative when projected therefrom and on rotation of the spooling member to pick up and coil a line upon the spool, a cam surface upon the stationary bearing for engaging and projecting the pin from the spooling member, and a control member on the drive shaft outwardly of the case for moving the shaft axially and thereby moving the spooling member away from the bearing member and freeing the pick-up pin from the cam whereby the pin will move inwardly and the line will peel off the spool for casting.

2. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, a radially extending inwardly spring biased pick-up pin slidably carried by the spooling member and operative when projected therefrom and on rotation of the spooling member to pick up and coil a line upon the spool, a cam surface upon the stationary bearing for engaging and projecting the pin from the spooling member, a control member on the drive shaft outwardly of the case for moving the shaft axially and thereby moving the spooling member away from the bearing member and freeing the pickup pin from the cam whereby the pin will move inwardly and the line will peel off the spool for casting, said pick-up pin comprising a hard smooth metal outer part inserted into a plastic-type material inner bar which engages the cam surface.

3. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, a radially extending inwardly spring biased pick-up pin slidably carried by the spooling member and operative when projected therefrom and on rotation of the spooling member to pick up and coil a line upon the spool, a cam surface upon the stationary bearing for engaging and projecting the pin from the spooling member, a control member on the drive shaft outwardly of the case for moving the shaft axially and thereby moving the spooling member away from the bearing member and freeing the pick-up pin from the cam whereby the pin will move inwardly and the line will peel off the spool for casting, said means for rotating the drive shaft including meshing gears, a click spring and operator to selectively engage said spring with the teeth of one of said gears, and the click operator having means to engage and lock the control member when the click spring is engaged with the gear.

4. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, a radially extending inwardly spring biased pick-up pin slidably carried by the spooling member and operative when projected therefrom and on rotation of the spooling member to pick up and coil a line upon the spool, a cam surface upon the stationary bearing for engaging and projecting the pin from the spooling member, a control member on the drive shaft outwardly of the case for moving the shaft axially and thereby moving the spooling member away from the bearing member and freeing the pick-up pin from the cam whereby the pin will move inwardly and the line will peel off the spool for casting, said means for rotating the drive shaft including meshing gears, a click spring and operator to selectively engage said spring with the teeth of one of said gears, and the click operator having a tongue moved into the path of the control member when the click spring is engaged with the gear to lock the drive shaft against axial movement.

5. A spinning reel of the character described having a case, a line spool in the case and a drive shaft operative on rotation to control the movement of a fish line onto and off of the spool and on axial movement to free the line for spin casting, a gear case, a driven gear upon said shaft and within the gear case, a crank shaft and means rotatably supporting the same on one of the two cases, a drive gear on the crank shaft meshing with said driven gear, a crank for rotating the crank shaft, means adjustably drivingly connecting the crank shaft and drive gear, a control member on the drive shaft for moving the same axially inward with respect to the case to free the line, a click spring and an operator shoe therefor slidable in said gear case to engage the spring with one of said gears, and a projection on said operator shoe movable into the path of said control member to lock the same against moving the drive shaft inward when the click spring is engaged.

6. For a spinning reel having a case, a line spool in the case and a shaft operative on rotation to control the movement of a fish line onto and off of the spool and on axial movement to free the line for spin casting, a stud on the case and means rotatably supported on the stud and operative to drive said shaft, the improvement which comprises an extension of said stud extending inward into the case, and the line spool having an opening to receive the inner end of the stud to lock the spool against rotation.

7. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, an outwardly extending inwardly spring biased pick-up member slidably carried by the spooling member and operative when projected therefrom and on rotation of the spooling member to pick up and coil a line upon the spool, a cam surface upon the stationary bearing for engaging and projecting the pick-up member from the spooling member, a control member on the drive shaft outwardly of the case for moving the shaft axially and thereby moving the spooling member away from the bearing member and freeing the pick-up member from the cam whereby the pickup member will move inwardly and the line will peel off the spool for casting, the said spool being reversible for right and left hand operation of the reel, and the said cam operating in both directions to project the pick-up member in either direction of rotation of the spooling member.

8. In a spinning reel, a case having an end plate and a removable cover having a line guide, a tubular bearing stationarily secured to said end plate, a stationary line spool removably mounted upon said bearing, a drive shaft rotatably and axially slidably mounted through the bearing, manually operative means connected to said shaft outside said case for rotating the shaft, a spooling member mounted upon the shaft inside the case and alongside said spool, an outwardly extending inwardly spring biased pick-up member carried by the spooling member and operative when projected therefrom and on rotation of the spooling member to pick up and coil a line upon the spool, a cam surface upon the stationary bearing for engaging and projecting the pick-up member from the spooling member, and a control member for the drive shaft exposed outwardly of the case for moving the shaft axially and thereby moving the spooling member away from the bearing member and freeing the pick-up member from the cam whereby the pick-up member will move inwardly and the line will peel off the spool for casting.

9. In a spinning reel, a case having an end plate, a line spool mounted adjacent said end plate, a drive shaft rotatably and axially slidably mounted through the end plate, manually operative means connected to said shaft for rotating the shaft and including a gear slidably but relatively non-rotatably mounted upon the drive shaft, a spooling member mounted upon the shaft alongside said spool, a spring biased pick-up member connected to the spooling member and operative when projected therefrom and on rotation of the spooling member to pick up and coil a line upon the spool, a cam surface stationarily associated with the end plate for engaging and projecting the pick-up member from the spooling member, and a control member for the drive shaft located at least in part outwardly of the case and operative for moving the shaft axially through said gear and end plate and thereby moving the spooling member away from the end plate to release the pick-up member whereby the member will move inwardly and the line will peel off the spool for casting.

References Cited in the file of this patent
UNITED STATES PATENTS

| | | |
|---|---|---|
| 1,056,392 | Barr et al. | Mar. 18, 1913 |
| 2,136,438 | Horsrud | Nov. 15, 1938 |
| 2,360,488 | Garman | Oct. 17, 1944 |
| 2,564,975 | Holm | Aug. 21, 1951 |
| 2,613,046 | Redding | Oct. 7, 1952 |
| 2,615,647 | Palmer et al. | Oct. 28, 1952 |
| 2,627,383 | Tibbetts | Feb. 3, 1953 |
| 2,668,025 | Hull | Feb. 2, 1954 |